UNITED STATES PATENT OFFICE.

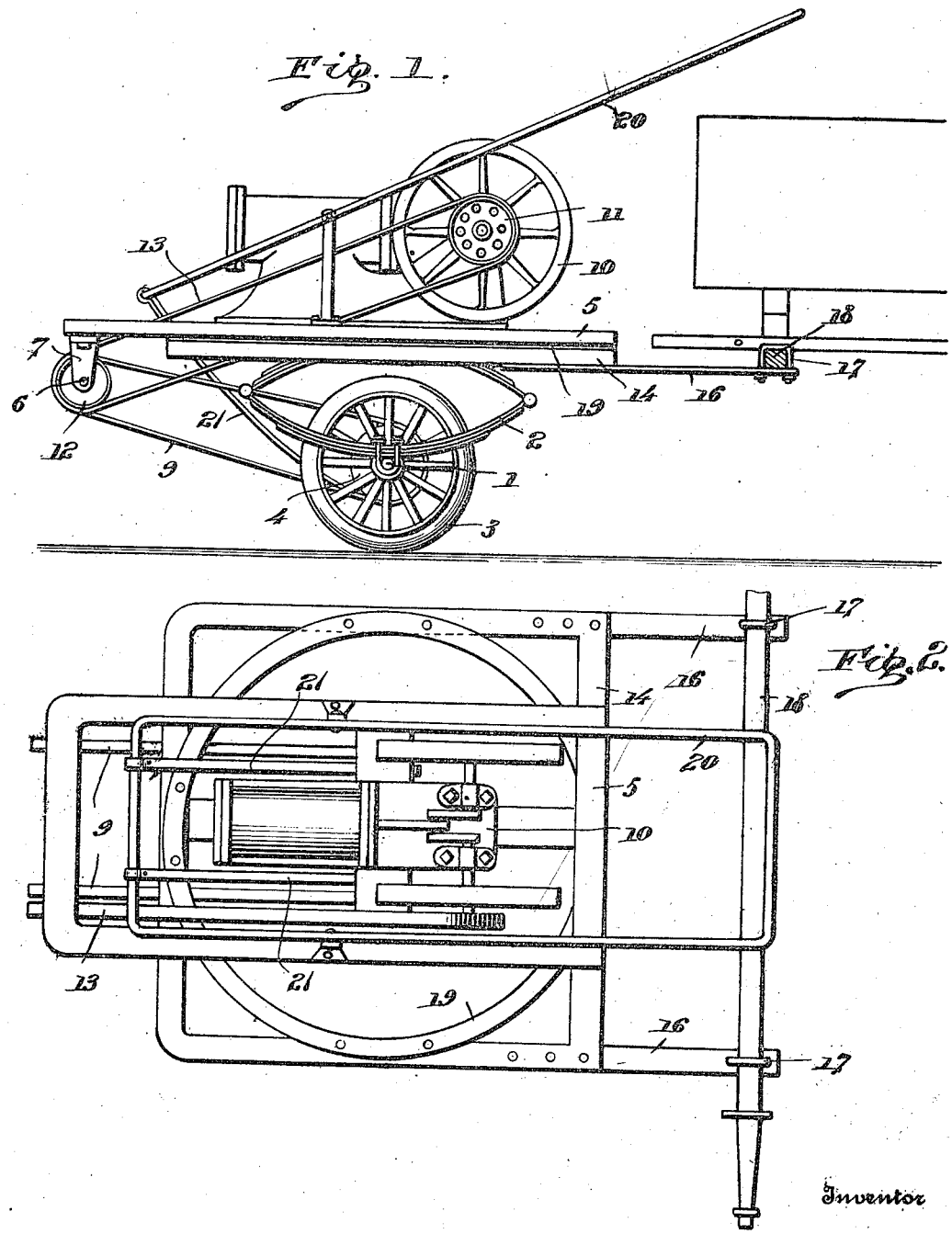

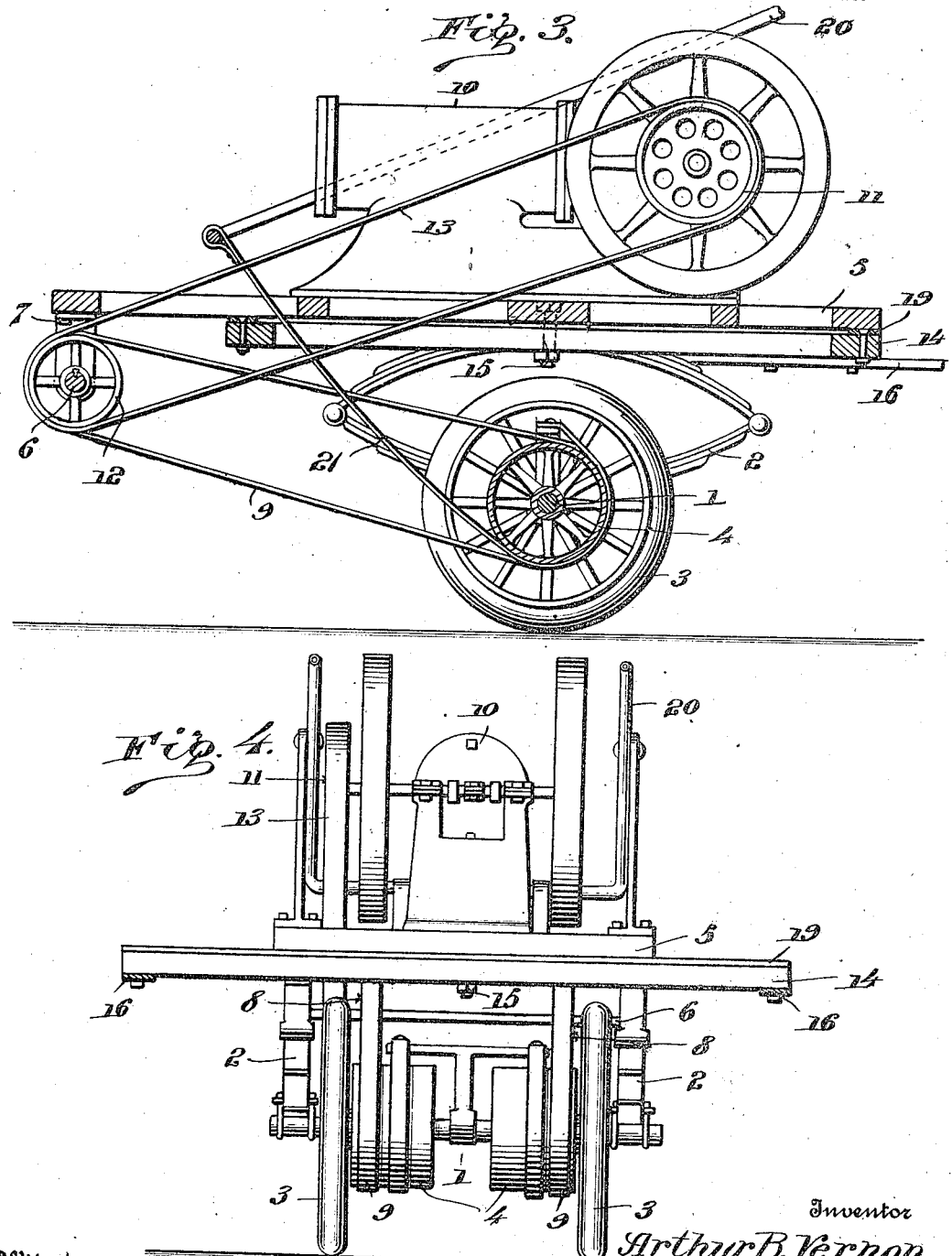

ARTHUR B. VERNON, OF CHICAGO, ILLINOIS.

VEHICLE-TRACTOR.

1,147,581.     Specification of Letters Patent.     Patented July 20, 1915.

Application filed December 3, 1913. Serial No. 804,500.

*To all whom it may concern:*

Be it known that I, ARTHUR B. VERNON, a citizen of the United States, residing at Chicago, in the county of Cook and State of Illinois, have invented new and useful Improvements in Vehicle-Tractors, of which the following is a specification.

This invention relates to vehicle tractors and it consists in the novel features hereinafter described and claimed.

An object of the invention is to provide a tractor of simple structure which is adapted to be connected with the front axle of a vehicle primarily intended to be drawn by animals and the parts of the tractor are so arranged that the same may be easily guided or steered by one who is in the body of the vehicle.

With the above objects in view the tractor comprises an axle having springs mounted upon the end portions thereof. A turn table is supported upon the upper portions of the spring and an engine is mounted upon the turn table. Ground wheels are journaled upon the axle and a shaft is journaled for rotation at the forward portion of the turn table and is operatively connected with the engine. Means is provided for rotating the ground wheels from the said shaft. A platform is pivotally connected with the turn table and is supported thereby and is adapted to be connected with the front axle of the vehicle. A steering frame is pivotally connected with the engine or the turn table and may be used by one occupying the body of the vehicle for directing or steering the said ground wheels. The said steering frame is further connected with brake mechanisms provided upon the axle and the ground wheels.

In the accompanying drawings: Figure 1 is a side elevation of the tractor. Fig. 2 is a top plan view of the same with parts removed. Fig. 3 is a vertical longitudinal sectional view of the same. Fig. 4 is a rear elevation of the same.

The tractor comprises an axle 1 upon the end portion of which are mounted elliptical springs 2. Ground wheels 3 are journaled for rotation upon the axle 1 and are provided at their inner sides with drums 4. A turn table 5 is mounted upon the upper sides of the springs 2 and is preferably oblong in plan. A shaft 6 is journaled for rotation at the forward end portion of the said table 5 in brackets 7 which depend from the said table. Belt pulleys are mounted upon the shaft 6 and belts 9 are trained around the pulleys 8 and the drums 4. An engine 10 (preferably of the hydrocarbon compression type) is mounted upon the turn table 5 and includes a pulley 11. A pulley 12 is mounted upon the shaft 6 and a belt 13 is trained around the pulleys 11 and 12 and is adapted to transmit rotary movement from the engine 10 to the shaft 6. A platform 14 is pivotally connected by means of a bolt 15 with the turn table 5 and the said bolt holds the platform up in position under the turn table. The said platform 14 is provided at its rear edge with rearwardly extending arms 16 having clips 17 adapted to receive the end portions of the front axle 18 of the vehicle to which the tractor is attached. The platform 14 is further provided with a circular track 19 which bears against the under side of the turn table 5 and which serves as means for holding the platform and the turn table in proper planes with relation to each other. A steering frame 20 is pivotally connected at a point between its ends with the bed of the engine 10 and one end of the said frame extends back toward the axle 18 and the other end of the said frame extends toward the forward edge of the turn table 5. Band brakes 21 are connected at one end with the forward end of the steering frame 20 and pass around the inner portions of the drum 4 and are secured at their rear ends with relation to the axle 1 in any suitable manner. By swinging the steering frame 20 horizontally the table 5 is turned from the platform 14 and through the springs 2 the axle 1 is swung so that the ground wheels 3 may be directed or guided as they move over the ground. By lowering the rear end of the steering frame 20 the band brakes 21 are drawn tight around the drums 4 so that the rotation of the wheels 3 may be checked or controlled.

In order to dispense with compensating gears or other similar complicated structures the drums 4 are made smooth as are also the pulleys 8 and belts 9. Consequently as the wheels 3 are turned or guided one wheel may rotate at a faster rate of speed than the other and the belts 9 may slip upon the pulleys 8 and drums 4 sufficiently to permit the said wheels 3 to rotate at the said different rates of speed.

From the above description taken in conjunction with the accompanying drawings it will be seen that a tractor of simple structure is provided and that the same may be easily and readily connected with a vehicle of the usual pattern adapted to be drawn by animals. Furthermore the said tractor may be guided or steered as it moves over the ground and by using the steering frame as a brake lever the progress of the tractor over the ground may be controlled or regulated.

Having described the invention what is claimed as new is:—

A tractor comprising an axle, springs mounted upon the axle, ground wheels mounted upon the axle, drums fixed with relation to the ground wheels, a turn table mounted on the springs, an engine mounted upon the turn table and operatively connected with the ground wheels, band brakes arranged to operate upon the drums, a steering frame pivotally mounted upon the turntable for vertical swinging movement and operatively connected with the band brakes and a platform pivotally connected with the turn table.

In testimony whereof I affix my signature in presence of two witnesses.

ARTHUR B. VERNON.

Witnesses:
LOUIS E. BRANDT,
LOUISE F. BRANDT.

Copies of this patent may be obtained for five cents each, by addressing the "Commissioner of Patents, Washington, D. C."